R. R. GRIFFITH.
PROCESS FOR MAKING WHEELS.
APPLICATION FILED JUNE 13, 1921.
1,435,388.
Patented Nov. 14, 1922.
2 SHEETS—SHEET 1.
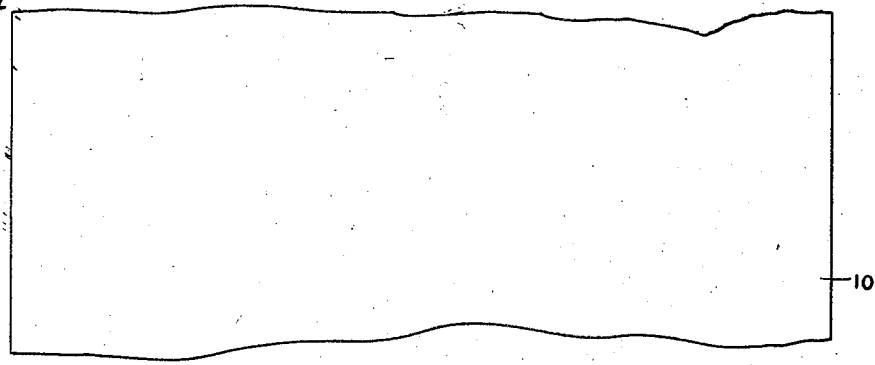
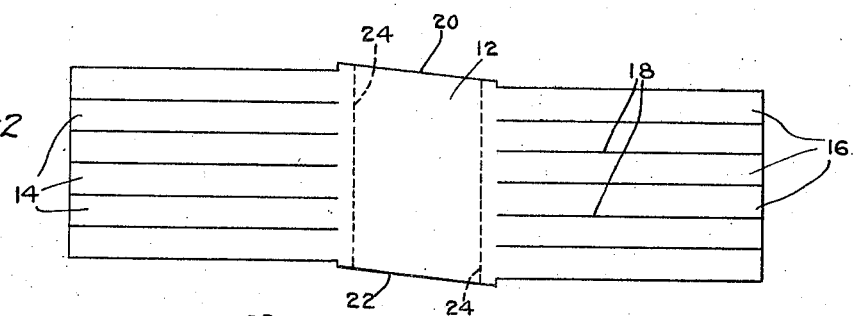
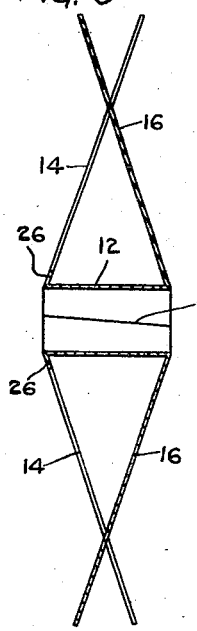
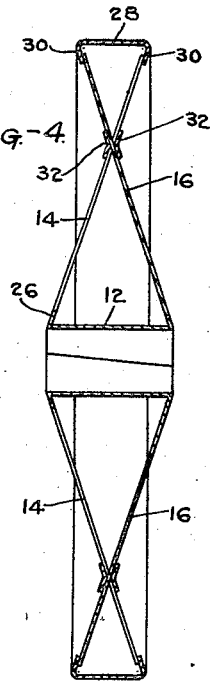
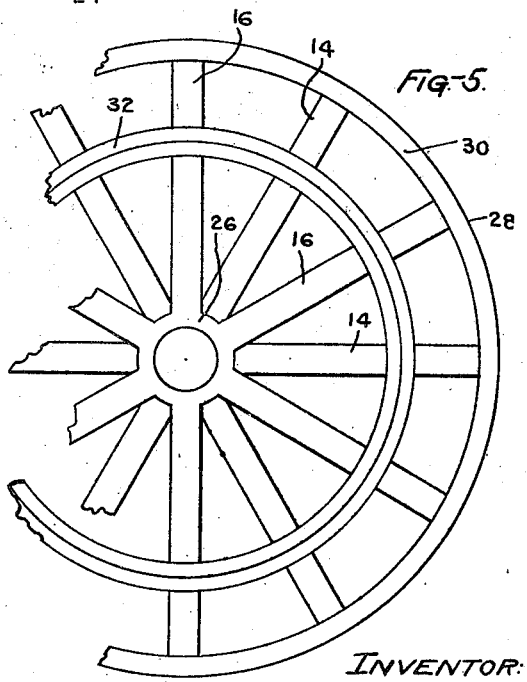
INVENTOR.
R. R. GRIFFITH.
By Whiteley and Ruckman
ATTORNEYS.

R. R. GRIFFITH.
PROCESS FOR MAKING WHEELS.
APPLICATION FILED JUNE 13, 1921.
1,435,388.
Patented Nov. 14, 1922.
2 SHEETS—SHEET 2.
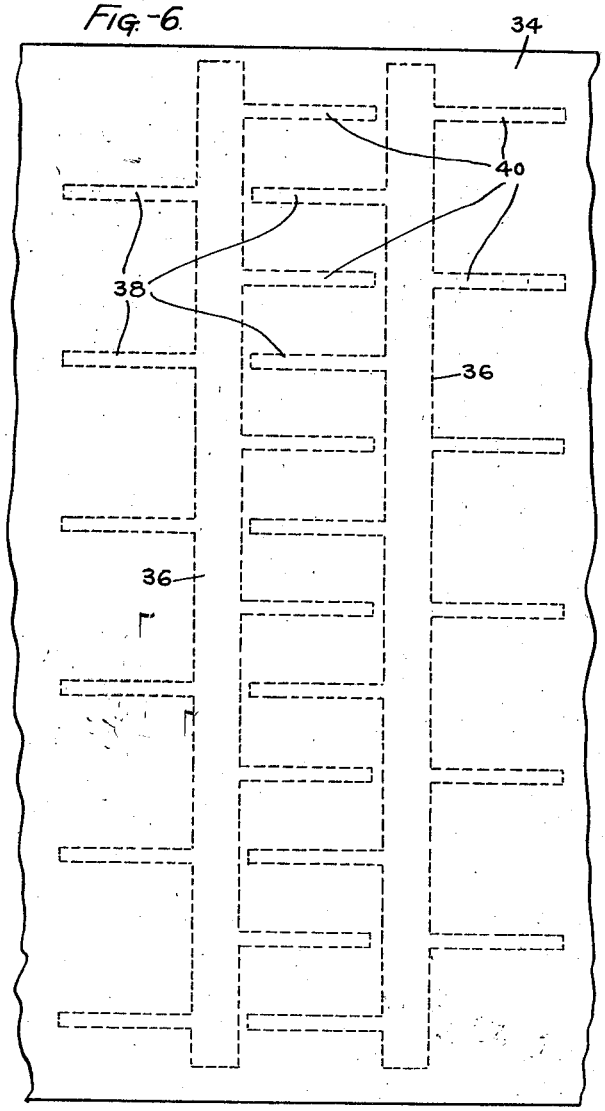
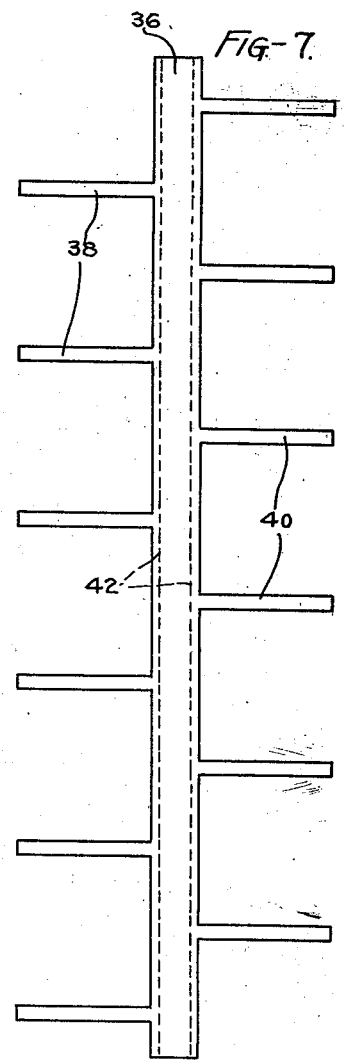
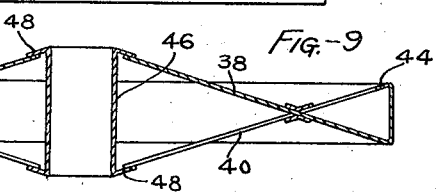
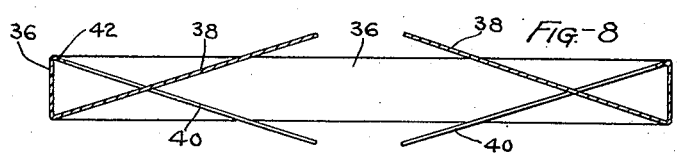
INVENTOR:
R. R. GRIFFITH.
BY Whiteley and Buckman
ATTORNEYS.

Patented Nov. 14, 1922.

1,435,388

UNITED STATES PATENT OFFICE.

RALPH R. GRIFFITH, OF MINNEAPOLIS, MINNESOTA.

PROCESS FOR MAKING WHEELS.

Application filed June 13, 1921. Serial No. 477,059.

*To all whom it may concern:*

Be it known that I, RALPH R. GRIFFITH, a citizen of the United States, residing at Minneapolis, in the county of Hennepin and State of Minnesota, have invented certain new and useful Improvements in Processes for Making Wheels, of which the following is a specification.

My invention relates to processes of making wheels from sheet metal. An object is to provide a process of making wheels by cutting from sheet metal one of the wheel members with integrally attached spoke elements, the said wheel member and spoke elements being then shaped and bent from their sheet form into the position which they occupy in the finished wheel.

The full objects and advantages of my invention will appear in connection with the detailed description, and the novel features embodied in my inventive idea will be particularly pointed out in the claims.

In the accompanying drawing which illustrate two forms in which my process may be carried out, Fig. 1 is a fragmentary plan view of a piece of sheet metal from which a hub and integrally attached spoke elements may be cut out. Fig. 2 is a plan view showing the hub member and the integrally attached spoke elements after cutting them from the sheet metal. Fig. 3 is a sectional view taken lengthwise through the hub after the hub member has been rolled up into the cylindrical form and the spoke elements have been positioned by bending them back through a little more than 90°. Fig. 4 is a sectional view through the wheel after it has been completed by the addition of a rim and a pair of annular reinforcing members. Fig. 5 is a side elevational view of the finished wheel, a small portion of the same being broken away. Fig. 6 is a fragmentary plan view of a piece of sheet metal showing in dotted lines the manner in which a series of rim members and integrally attached spoke elements are cut out. Fig. 7 is a plan view showing the rim member and integrally attached spoke elements after cutting them from the sheet metal. Fig. 8 is a sectional view through the structure produced by rolling up the rim member into ring form and by bending the spoke elements back through a little more than 90°. Fig. 9 is a sectional view through the wheel after it has been completed by the addition of a hub and a pair of annular reinforcing members.

Referring first to the form shown in Figs. 1 to 4, the numeral 10 designates a blank of sheet metal from which the structure shown in Fig. 2 is cut. This structure includes a hub member 12 having a plurality of integrally attached spoke elements 14 extending from one end and a plurality of integrally attached spoke elements 16 extending from the opposite end. These spoke elements are cut from each other on lines such as indicated at 18 but are left attached at their bases to the hub member. The spoke elements 14 and 16 respectively are offset with relation to each other on account of the fact that the cuts 18 on one end are midway between the cuts 18 on the other end. In order to compensate for this staggered or offset arrangement, the side margins 20 and 22 of the hub member are cut on inclined lines which are located slightly beyond the bases of the adjacent spoke elements, this latter arrangement being in order that sufficient over-lap may be provided for securing the margins together. It will be understood, therefore, that after the structure shown in Fig. 2 has been provided, the hub member 12 is rolled up into cylindrical form with the margins 20 and 22 slightly overlapped in order that they may be secured together as by spotwelding. The spoke elements at both ends of the hub member are bent back through a little more than 90°. This bending is preferably on the dotted lines 24 shown in Fig. 2 instead of in lines at the bases of the spoke elements. This manner of bending provides flanges 26 around both edges of the hub. The shaping of the hub into cylindrical form and the bending back of the spoke elements may be performed in any suitable manner as by the use of shaping dies. After the spoke elements have been given the crossed relation shown in Fig. 3, a rim 28 having inturned flanges 30 is added by securing these flanges to the ends of the spoke elements in suitable manner as by spotwelding. The spoke elements are preferably reinforced by securing in suitable manner as by spotwelding a pair of angle bars 32 on opposite sides at the places where the spokes cross from one side of the wheel to the other. The wheel when finished has the appearance shown in Fig. 5.

In the form shown in Figs. 6 to 9, the spoke elements instead of being cut out integrally with the hub member are cut out integrally with the rim member. The numeral 34 designates a blank of sheet metal from which the structure shown in Fig. 7 is cut out. The manner in which this structure can be cut out to save material is shown in Fig. 6. This structure includes a rim member 36 having a plurality of integrally attached spoke elements 38 extending from one side and a plurality of integrally attached spoke elements 40 extending from the opposite side. The elements 38 and 40 are arranged in staggered relation with respect to each other. After the structure shown in Fig. 7 has been provided, the rim member 36 is rolled up into ring form and the ends thereof secured together in suitable manner as by spotwelding. The spoke elements on both sides of the rim member are bent back through a little more than 90° as shown in Fig. 8 to give them the cross relation shown. This bending is preferably on the dotted lines 42 shown in Fig. 7, instead of on lines directly at the bases of the spoke elements. This manner of bending provides inwardly extending flanges 44 around both sides of the rim. The shaping of the rim into ring form and the bending back of the spoke elements may be performed in any suitable manner as by the use of shaping dies. After the spokes have been given the cross relation shown in Fig. 8, a hub 46 of the proper length and having out-turned flanges 48 is added by securing the flanges 48 to the inner ends of the spoke elements in suitable manner as by spotwelding. The spoke elements are preferably reinforced by securing a pair of annular members 50 thereto on opposite sides where the spokes cross from one side of the wheel to the other. The wheel when finished has the same appearance as the form previously described and referred to in Fig. 5 in its finished condition.

The advantages of my process are obvious. Wheels having great strength and durability can be cheaply and readily constructed from sheet metal. The operation is greatly facilitated by cutting out one of the wheel members with integrally attached spoke elements.

I claim:

The process of making wheels which consists in cutting from sheet metal a wheel member and integrally attached spoke elements, shaping the cut-out structure into the form which it occupies in the finished wheel by bending said wheel member into circular form and by bending said spoke elements backwardly through more than 90° to cause said spoke elements to cross from one side of the wheel to the other, securing reinforcing annular members to said spoke elements where they thus cross and then securing the other wheel member to the free ends of said spoke elements.

In testimony whereof I hereunto affix my signature.

RALPH R. GRIFFITH.